Jan. 21, 1964 W. S. WOLFRAM 3,118,526
CLUTCH MECHANISM
Filed July 13, 1960

INVENTOR.
William S. Wolfram
BY Robert G. Gerhardt
ATTORNEY

3,118,526
CLUTCH MECHANISM
William S. Wolfram, Birmingham, Mich., assignor to General Motors Corporation, Detroit, Mich., a corporation of Delaware
Filed July 13, 1960, Ser. No. 42,577
4 Claims. (Cl. 192—68)

This invention relates to clutch mechanism and more particularly to friction clutches having vibration dampening characteristics.

Conventional friction clutches such as those utilized in motor vehicles are designed to have a torque capacity greater than the maximum torque load that may be applied to them. Under certain conditions in motor vehicle drive trains, there can occur high torque torsional oscillations or vibrations in the drive train which not only can cause high stresses in the engine and drive train components, but also are unpleasant to the driver and occupants of the vehicle. One instance where these vibrations could occur is where the vehicle wheels are spinning on ice and they suddenly take hold. Any flexibility in the drive line will permit this sudden shock to produce a high energy, high amplitude vibration. If all or at least some of this energy could be dissipated during the reverse torque transmission through the drive train, the vibrations could be limited to a low value. Since the conventional clutch has a high torque capacity at all times, it cannot provide any friction damping by slipping of the clutch friction surfaces.

It is therefore an object of this invention to provide a clutch assembly having a non-slip continuous torque capacity sufficiently high to carry the normal load imposed on the clutch and a lower torque capacity for sudden reversals of torque or for torsional oscillation loads imposed on the clutch.

Another object of the invention is to provide a friction clutch assembly that will automatically provide frictional vibration dampening when subject to torsional oscillations or changes in torque direction above a predetermined value.

Still another object is to provide a clutch in accordance with the above which requires making a minimum of change from a conventional motor vehicle clutch.

These and other objects and advantages will be apparent from the following figures and description which illustrate one embodiment of the invention and in which.

Figure 1:
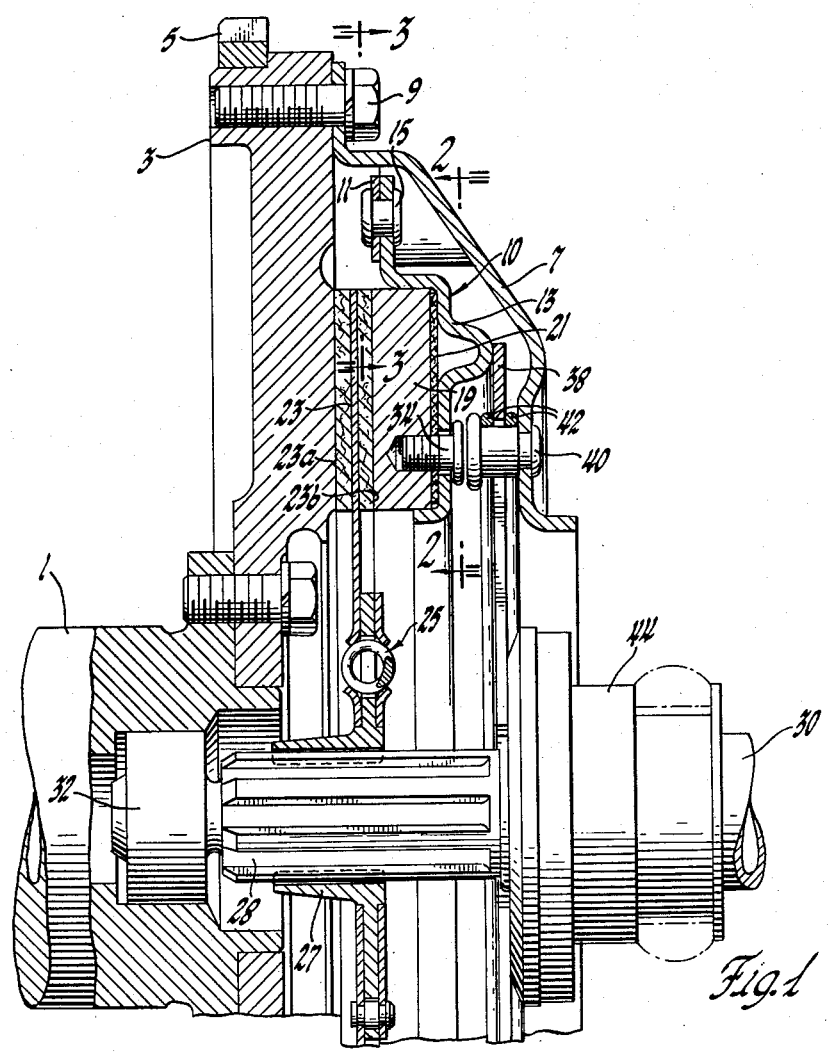
FIGURE 1 is a sectional view of a clutch assembly incorporating the invention.
Figures 2, 3:
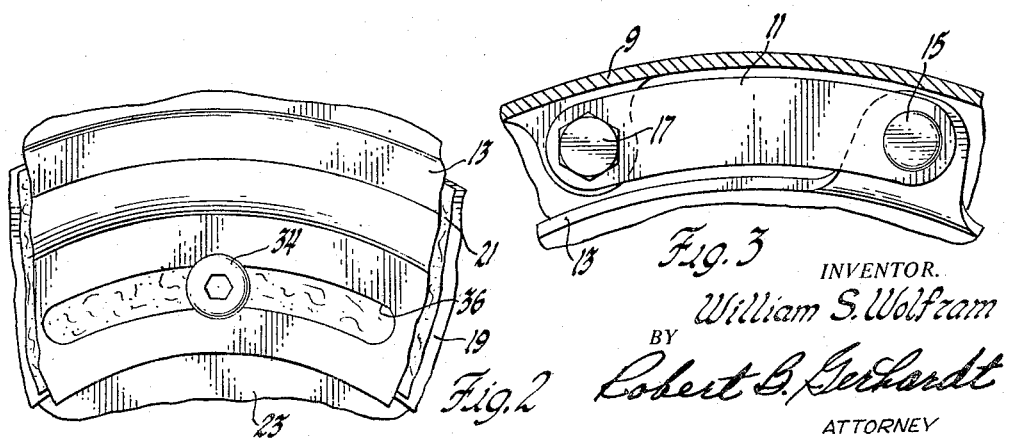
FIGURE 2 is a sectional view taken on the lines 2—2 of FIGURE 1.
FIGURE 3 is a sectional view taken on lines 3—3 of FIGURE 1.

Referring now to FIGURE 1, the clutch assembly is shown connected to a driving shaft 1 which may be an engine crankshaft. A conventional flywheel 3 is bolted to the driving shaft and has the usual starter gear teeth 5 formed on the periphery thereof. A conventional cover plate 7 is held by bolts 9 to the flywheel 3. A two-piece pressure plate assembly generally designated 10 includes a formed drive member 13, which will hereinafter be referred to as the pressure pad. The pressure pad 13 is connected by a plurality of drive straps 11, as seen in FIGURES 1 and 3, to the cover plate 7 by rivets 15 and bolts 17.

The drive straps 11, only one of which is shown in the figures, transmit rotational drive from the cover plate 7 to the pressure pad 13 while allowing relative axial movement between these members. The pressure plate assembly 10 also includes a pressure disc member 19 having a friction surface 21 thereon in engagement with the pressure pad 13.

Located between the flywheel 3 and the disc 19 is a conventional driven disc 23 having friction surfaces 23a and 23b for frictionally engaging the flywheel 3 and disc 19 respectively. The driven disc 23 is connected through a conventional vibration damper, generally designated 25, to a hub 27 that has internal teeth engaging splines 28 formed on a driven or output shaft 30. The output shaft 30 has the usual pilot bearing 32 journaled in the driving shaft 1.

Threaded into the pressure disc 19 are a plurality of pins 34 which extend through cooperating slots 36 formed in pressure pad 13. The pins 34 and the ends of the slots 36 serve as a stop means for limiting relatively rotational movement in each direction between the pressure pad 13 and the pressure disc 19.

The clutch pack is urged into frictional engagement by a diaphragm spring 38. The diaphragm spring 38 pivots on a pair of pivot rings 42 supported by pivot pins 40, only one of which is shown. The inner end of the diaphragm spring engages a throwout bearing 44 which slidably surrounds the driven shaft 30 and which acts to release the clutch when moved to the left as seen in FIGURE 1. The engagement and disengagement of the clutch is conventional.

It will be seen that the torque capacity of the clutch is dependent on the friction surfaces 23a and 23b and 21. Friction surface 21 is designed to have a lower coefficient of friction so that it has a lower torque capacity than that of 23b. The torque capacity of surface 21 would also be made lower by providing a smaller contact area. The total torque capacity of the clutch for complete no slip operation is therefore the sum of capacities of friction surface 23a and friction surface 21. If the torque exceeds this capacity, the friction surface 21 will allow the pressure pad 13 to move relative to the pressure disc 19 until the pin 34 engages one end of the slot 36. The torque capacity of the clutch at this time is that of the sum of surfaces 23a and 23b. This capacity is the normal maximum torque capacity for unidirection drive through the clutch.

If a high energy torque reversal is imposed on the drive train, the friction surface 21 will allow a limited slip between the pressure pad 13 and pressure plate 19 simultaneously dissipating energy through friction heat and thereby dampening any torsional oscillation that may be produced. This slip is limited by the length of the slots 36.

As an example, assume that each of the friction faces 23a and 23b have a non-slip torque capacity of 200 ft. lb. and that the friction surface 21 has a non-slip capacity of 20 ft. lb. The normal torque capacity of the clutch is then 400 ft. lb. (200 ft. lb. plus 200 ft. lb.) The torque reversal or torsional oscillations capacity of the clutch is 200 ft. lb. plus 20 ft. lb. of 220 ft. lb. Thus any reversing torque greater than 220 ft. lb. will cause slip and hence friction damping.

It can be seen from the above that I have provided a simple clutch assembly having one predetermined torque capacity for continuous direction torque transmittal but has a lower torque capacity for oscillatory or reversing torque transmittal whereby torsional oscillations or vibrations are frictionally damped.

Changes, modifications, and other applications will be readily apparent and are within the scope of the invention, which is limited only by the following claims.

I claim:
1. In a vibration dampening clutch assembly, a driving member, a driven member, a driving plate connected to said driving member for rotation therewith, a pressure plate assembly having a first portion, means connecting said first portion to said driving plate for rotation therewith while allowing relative axial movement therebetween, a second pressure plate portion adjacent to said first portion, first friction means between said first and second portions, first stop means connected to one of said portions for rotation therewith, second stop means on the other of said portions for cooperating with said first stop means to limit relative rotation between said portions in either direction of rotation, said first friction means retarding relative rotation between said portions, a driven disc between said driving member and said second portion, second friction means between said driven disc and said driving member, third friction means between said driven disc and said pressure plate second portion, means connecting said driven disc with said driven member, and means for urging said first portion, said second portion, said driven disc and said driving member into frictional engagement with a predetermined force.

2. The clutch assembly of claim 1 wherein said first friction means has a lower torque capacity than said second or said third friction means.

3. In a vibration dampening clutch assembly, a driving member, a driven member, a driving plate connected to said driving member for rotation therewith, a pressure plate assembly having a first portion, means connecting said first portion to said driving plate for rotation therewith while allowing relative axial movement therebetween, a second pressure plate portion adjacent to said first portion, first friction means between said first and second portions, first stop means connected to one of said portions for rotation therewith, second stop means on the other of said portions for cooperating with said first stop means to limit relative rotation between said portions in either direction of rotation, said first friction means retarding relative rotation between said portions, a driven disc between said driving member and said second portion, second friction means between said driven disc and said driving member, third friction means between said driven disc and said pressure plate second portion, means connecting said driven disc with said driven member, and means for urging said first portion, said second portion, said driven disc and said driving member into frictional engagement with a predetermined force, said first friction means having a coefficient of friction and an effective frictional area combining to provide a non-slip torque capacity less than the non-slip torque capacity of said third friction means.

4. In a clutch assembly, a driving member, a driven member, a driving plate connected to said driving member for rotation therewith, a pressure plate assembly having a first portion, means connecting said first portion to said driving plate for rotation therewith while allowing relative axial movement therebetween, a second pressure plate portion adjacent to said first portion, first friction means between said first and second portions, one of said portions having a circumferential slot therein, the other of said portions having a stop member thereon extending into said slot, said slot and stop member cooperating to limit relative rotation between said portions, said first friction means retarding relative rotation between said portions, a driven disc between said driving member and said second portion, second friction means between said driven disc and said driving member, third friction means between said driven disc and said pressure plate second portion, means connecting said driven disc with said driven member, and means urging said first portion, said second portion, said driven disc and said driving member into frictional engagement.

References Cited in the file of this patent
UNITED STATES PATENTS

| | | |
|---|---|---|
| 1,726,826 | Hawkins | Sept. 3, 1929 |
| 2,277,557 | Nutt | Mar. 24, 1942 |
| 2,739,683 | Gamundi | Mar. 27, 1956 |

FOREIGN PATENTS

| | | |
|---|---|---|
| 493,564 | Great Britain | Oct. 11, 1938 |